(12) United States Patent
Tsai

(10) Patent No.: US 6,389,705 B1
(45) Date of Patent: May 21, 2002

(54) OPTICAL CALIBRATION PLATE AND THE ASSEMBLING METHOD FOR THE SAME

(75) Inventor: Kun-Shiang Tsai, Taipei (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/534,080

(22) Filed: Mar. 24, 2000

(51) Int. Cl.$^7$ ............................................. G01D 21/00
(52) U.S. Cl. ........................... 33/613; 33/645; 33/655; 358/406
(58) Field of Search ......................... 33/613, 533, 614, 33/645, 562, 615, 616, 617, 619, 620, 621, 622, 623, 655; 356/243.1, 243.4; 358/406, 504; 250/252.1; 403/373, 374.1, 345

(56) References Cited

U.S. PATENT DOCUMENTS

| | | | | |
|---|---|---|---|---|
| 3,487,552 A | * | 1/1970 | Hoffer | 33/616 |
| 4,604,811 A | * | 8/1986 | Roosen | 33/617 |
| 5,801,962 A | * | 9/1998 | Sheu et al. | 358/406 |
| 5,933,975 A | * | 8/1999 | Pate | 33/645 |
| 6,011,632 A | * | 1/2000 | Chiang | 358/406 |

* cited by examiner

Primary Examiner—Diego Gutierrez
Assistant Examiner—Madeline Gonzalez
(74) Attorney, Agent, or Firm—Rosenberg, Klein & Lee

(57) ABSTRACT

An optical calibration plate and the assembling method for the same are disclosed. The optical calibration plate is assembled on a cover of an optical apparatus, the cover has a clamping means and the optical calibration plate is locked on the clamping means. The assembling method comprises following steps: (1) clamping one side of the optical calibration plate on a clamping means of a cover of an optical apparatus; and (2) clamping another side of the optical calibration plate on another clamping means of the cover. The optical calibration plate has less contamination because the operator will not touch the optical calibration and the processing time and cost are reduced.

2 Claims, 5 Drawing Sheets

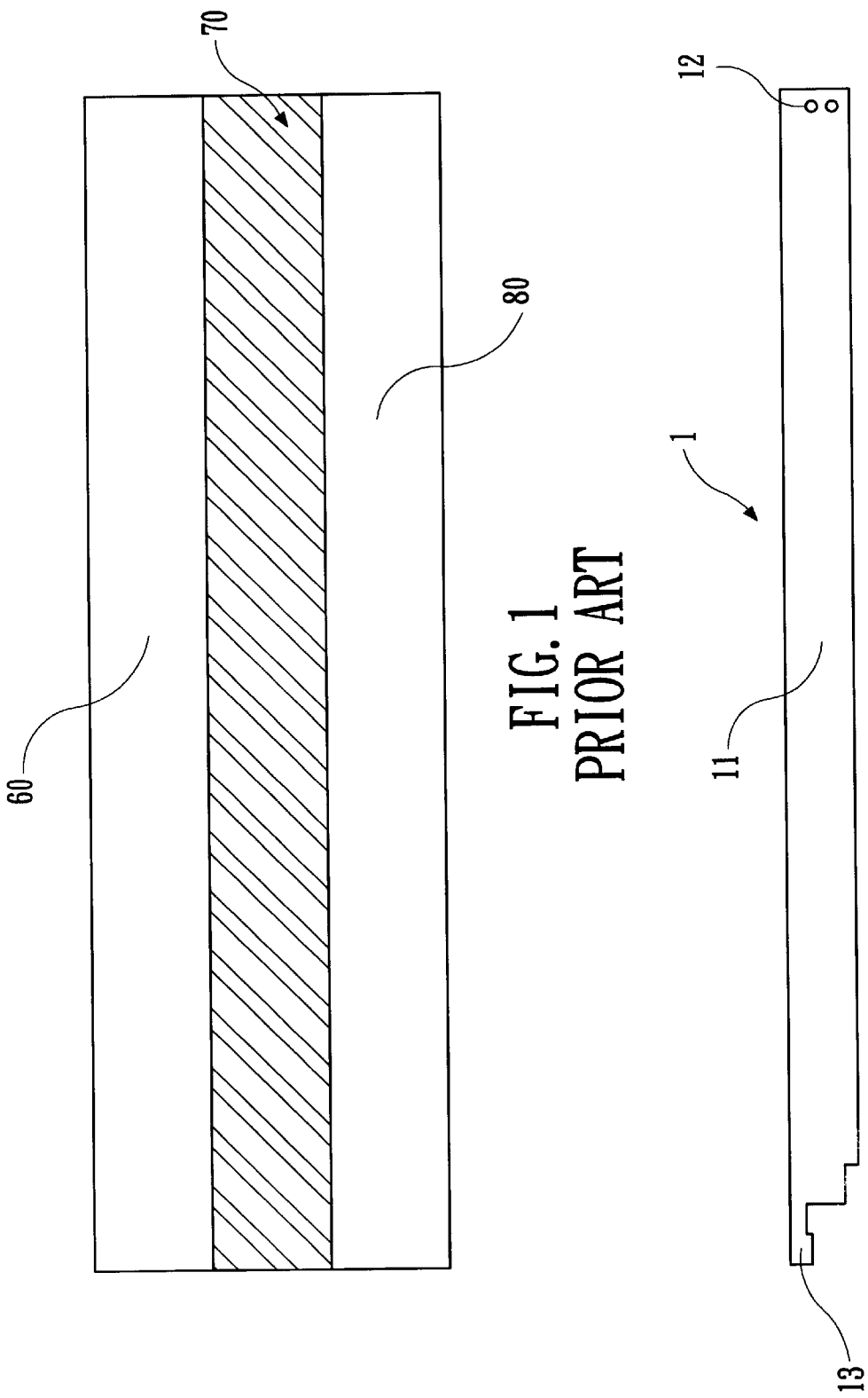

OPTICAL CALIBRATION PLATE AND THE ASSEMBLING METHOD FOR THE SAME

FIELD OF THE PRESENT INVENTION

The present invention relates to an optical calibration plate and the assembling method for the same, especially to an optical calibration plate which will not be stained by a hand during assembling. Background of the present invention A scanner generally has an optical calibration plate attached on the cover thereof, providing a basis for calibration. However, the conventional optical calibration plate is attached on the cover manually. The surface of the optical calibration plate may be stained by an operator's hand and the calibration is degraded. The staining problem can be overcome by attaching a protective film over the optical calibration plate. Nevertheless, the assembling time and cost are increased.

As shown in FIG. 1, a conventional optical calibration plate assembly comprises a protective film 60, an optical calibration plate 70 and a binder lid 80. The operator performs the following steps to assembled the optical calibration plate 70 on the cover of the scanner.

(1) Removing the binder lid 80.

(2) Registering the optical calibration plate 70 to a clamping member on the cover of the scanner.

(3) Attaching one side of the optical calibration plate 70 to a corresponding portion on the cover and then attaching whole optical calibration plate 70 on the cover.

(4) Removing the protective film 60.

The above mentioned processes have following drawbacks.

(1) The operators should pay much attention on registering the optical calibration plate.

(2) The operators spend considerable time in pasting the optical calibration plate to the cover and the optical calibration plate may be stained by the binder.

(3) The operators spend considerable time in removing the binder lid and the protective film.

(4) The conventional optical calibration plate assembly comprises a protective film and a binder lid, the cost thereof is high.

BRIEF SUMMARY OF THE INVENTION

It is an object of the invention to provide an assembling method for an optical calibration plate, comprising the following steps: clamping one side of the optical calibration plate on a clamping means of a cover of an optical apparatus: and clamping another side of the optical calibration plate on another clamping means of the cover.

It is another object of the invention to provide an optical calibration plate having low cost due to elimination of the protective film and the binder lid.

It is still another object of the invention to provide an optical calibration plate having less contamination because the operator will not touch the optical calibration region.

It is still another object of the invention to provide an optical calibration plate having reduced processing time and cost because the task of registering and removing the protective film and the binder lid are saved.

The various objects and advantages of the present invention will be more readily understood from the following detailed description when read in conjunction with the appended drawings, in which:

BRIEF DESCRIPTION OF DRAWING

FIG. 1 shows a conventional optical calibration plate assembly;

FIG. 2 shows the schematic view of an optical calibration plate according to the first preferred embodiment of the present invention;

DETAIL DESCRIPTION OF PREFERRED EMBODIMENT

Figure 3:
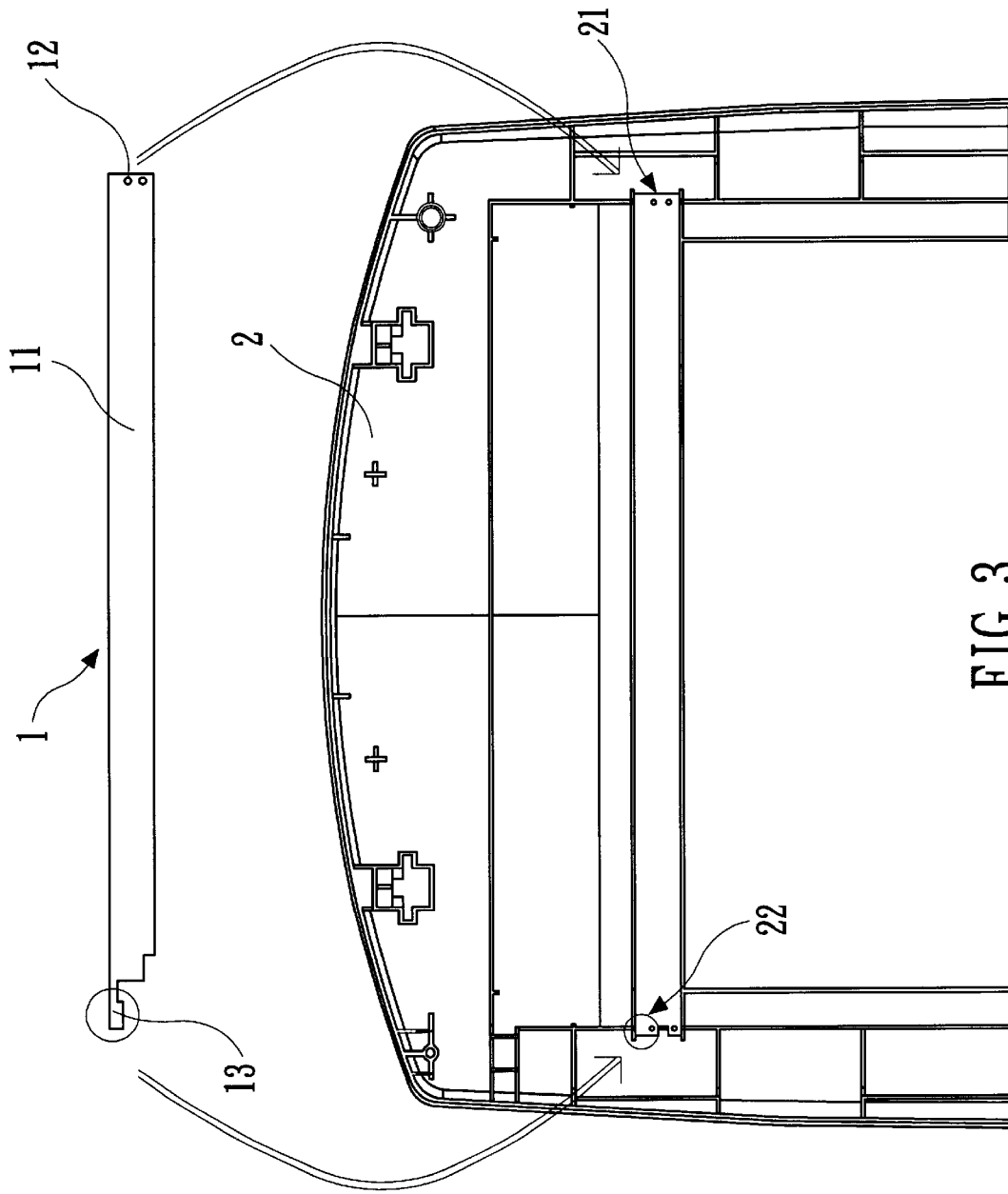
FIG. 3 shows the schematic view of an optical calibration plate according to present invention before assembling on a scanner.
Figure 4:
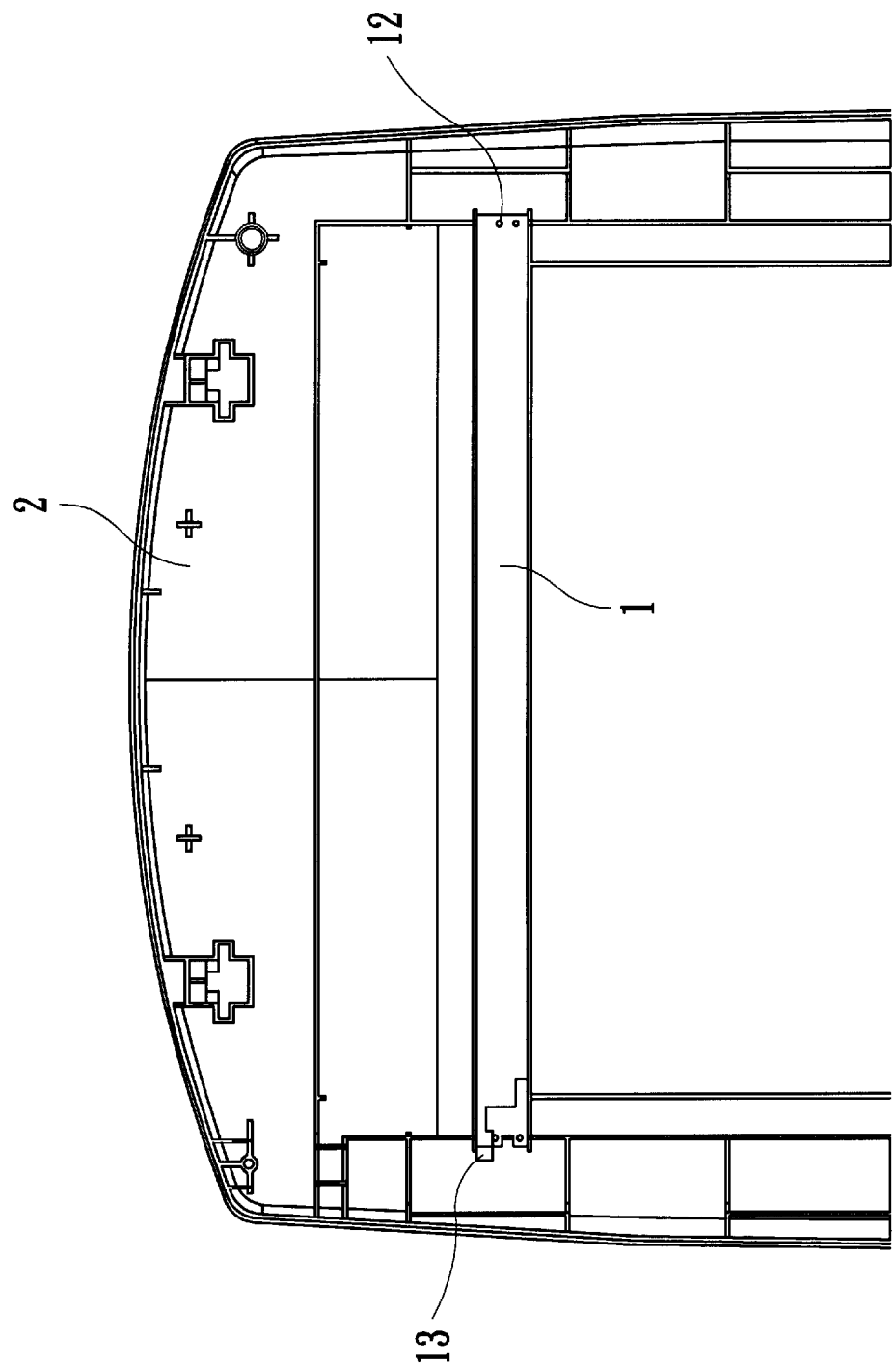
FIG. 4 shows the schematic view of an optical calibration plate according to present invention after assembling on a scanner.

FIG. 2 shows the schematic view of an optical calibration plate 1 for easy assembling according to the first preferred embodiment of the present invention. The optical calibration plate 1 comprises an optical calibration region 11, two positioning holes 12 on the right side of the optical calibration region 11, and a step-shaped locking part 13 on the left top side of the optical calibration region 11. With reference to FIGS. 3 and 4, the optical calibration plate 1 according to the first preferred embodiment of the present invention can be assembled on the cover of the scanner:

(1) Clamping the positioning holes 12 on one side of the optical calibration plate 1 to a first clamping means 21 (a clamping shaft in the first preferred embodiment) of the cover 2 on the scanner.

(2) Locking the locking part 13 on another side of the optical calibration plate 1 on a second clamping means 22 of the cover 2 on the scanner.

Figure 5:
FIG. 5 shows the schematic view of an optical calibration plate according to the second preferred embodiment of the present invention.

FIG. 5 shows the schematic view of an optical calibration plate 1 according to the second preferred embodiment of the present invention. The optical calibration plate 1 comprises an optical calibration region 11, two pairs of positioning holes 12 and 14 on right and left side of the optical calibration region 11. The optical calibration plate 1 according to the present invention can be easily assembled to the cover 2 of the scanner.

Figure 6:
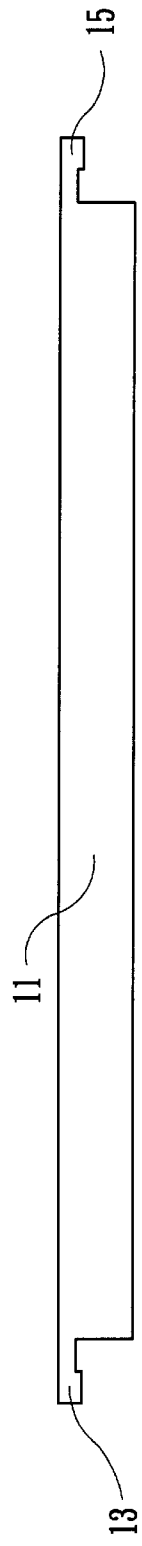
FIG. 6 shows the schematic view of an optical calibration plate according to the third preferred embodiment of the present invention.

FIG. 6 shows the schematic view of an optical calibration plate 1 according to the third preferred embodiment of the present invention. The optical calibration plate 1 comprises an optical calibration region 11, two step-shaped locking parts 13 and 15 on right top and left top side of the optical calibration region 11. The optical calibration plate 1 according to the present invention can be easily assembly to the cover 2 of the scanner.

Figure 7:
FIG. 7 shows the schematic view of an optical calibration plate according to the fourth preferred embodiment of the present invention.

FIG. 7 shows the schematic view of an optical calibration plate 1 according to the fourth preferred embodiment of the present invention. The optical calibration plate 1 comprises an optical calibration region 11, a step-shaped locking part 13 on the left top side of the optical calibration region 11, and a step-shaped locking part 16 on the right bottom side of the optical calibration region 11. The optical calibration plate 1 according to the present invention can be easily assembled to the cover 2 of the scanner.

Figure 8:
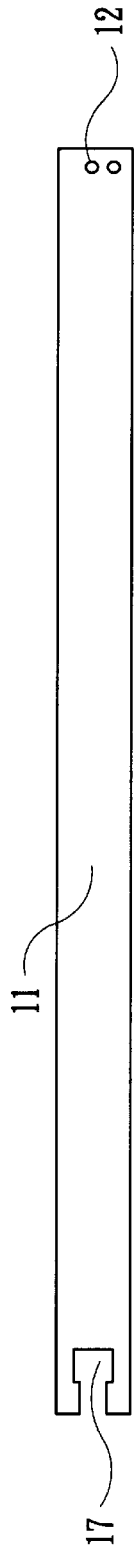
FIG. 8 shows the schematic view of an optical calibration plate according to the fifth preferred embodiment of the present invention.

FIG. 8 shows the schematic view of an optical calibration plate 1 according to the fifth preferred embodiment of the present invention. The optical calibration plate 1 comprises an optical calibration region 11, two positioning holes 12 on right side of the optical calibration region 11, and a positioning groove 17 on left side of the optical calibration region 11. The optical calibration plate 1 according to the present invention can be easily assembled to the cover 2 of the scanner.

Figure 9:
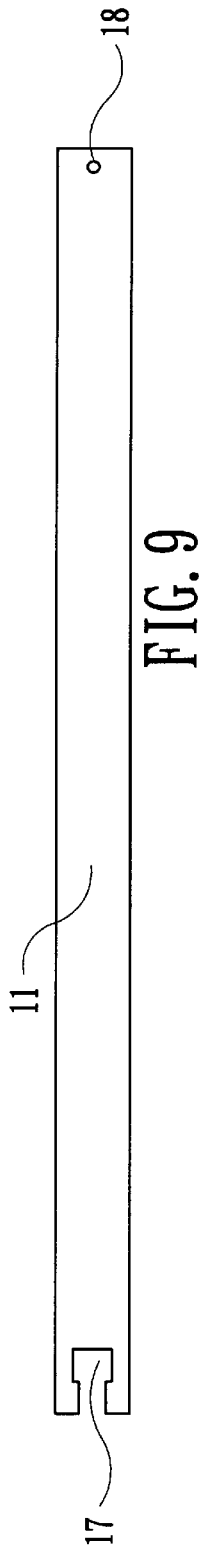
FIG. 9 shows the schematic view of an optical calibration plate according to the sixth preferred embodiment of the present invention.

FIG. 9 shows the schematic view of an optical calibration plate 1 according to the sixth preferred embodiment of the present invention. The optical calibration plate 1 comprises an optical calibration region 11, a positioning hole 18 on right side of the optical calibration region 11, and a positioning groove 17 on left side of the optical calibration region 11. The optical calibration plate 1 according to the present invention can be easily assembled to the cover 2 of the scanner.

Figure 10:
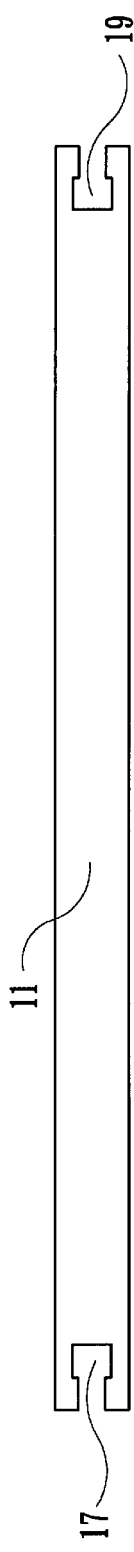
FIG. 10 shows the schematic view of an optical calibration plate according to the seventh preferred embodiment of the present invention.

FIG. 10 shows the schematic view of an optical calibration plate 1 according to the seventh preferred embodiment of the present invention. The optical calibration plate 1 comprises an optical calibration region 11, two positioning grooves 17 and 19 on right and left side of the optical calibration region 11. The optical calibration plate 1 according to the present invention can be easily assembled to the cover 2 of the scanner.

Figure 11:
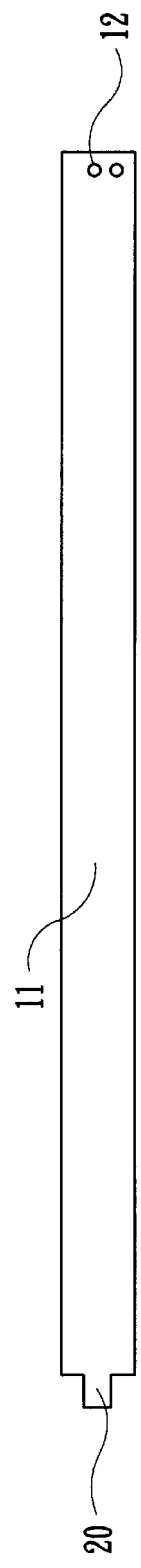
FIG. 11 shows the schematic view of an optical calibration plate according to the eighth preferred embodiment of the present invention.

FIG. 11 shows the schematic view of an optical calibration plate 1 according to the eighth preferred embodiment of the present invention. The optical calibration plate 1 comprises an optical calibration region 11, two positioning holes 12 on the right side of the optical calibration region 11, and a positioning flange 20 on the left side of the optical calibration region 11. The optical calibration plate 1 according to the present invention can be easily assembled to the cover 2 of the scanner.

Figure 12:
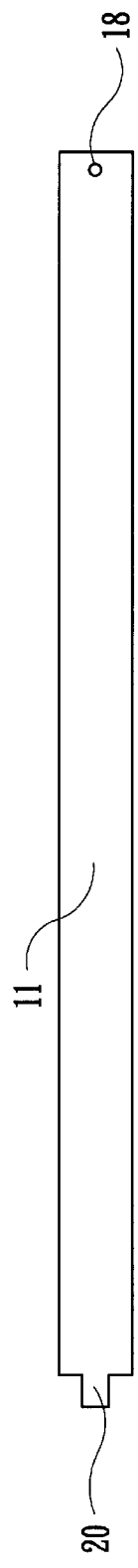
FIG. 12 shows the schematic view of an optical calibration plate according to the ninth preferred embodiment of the present invention.

FIG. 12 shows the schematic view of an optical calibration plate 1 according to the ninth preferred embodiment of the present invention. The optical calibration plate 1 comprises an optical calibration region 11, a positioning hole 18 on the right side of the optical calibration region 11, and a positioning flange 20 on the left side of the optical calibration region 11. The optical calibration plate 1 according to the present invention can be easily assembled to the cover 2 of the scanner.

Figure 13:
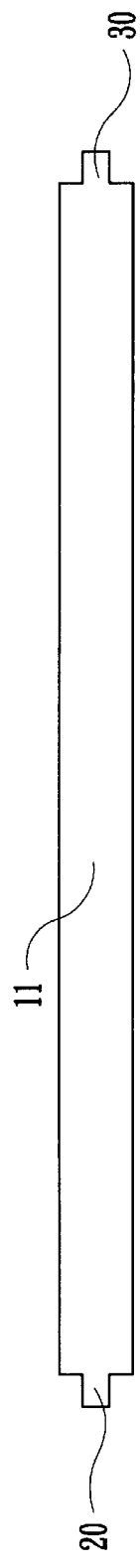
FIG. 13 shows the schematic view of an optical calibration plate according to the tenth preferred embodiment of the present invention.

FIG. 13 shows the schematic view of an optical calibration plate 1 according to the tenth preferred embodiment of the present invention. the optical calibration plate 1 comprises an optical calibration region 11, two positioning flanges 20 and 30 on right and left side of the optical calibration region 11. The optical calibration plate 1 according to the present invention can be easily assembled to the cover 2 of the scanner.

Figure 14:
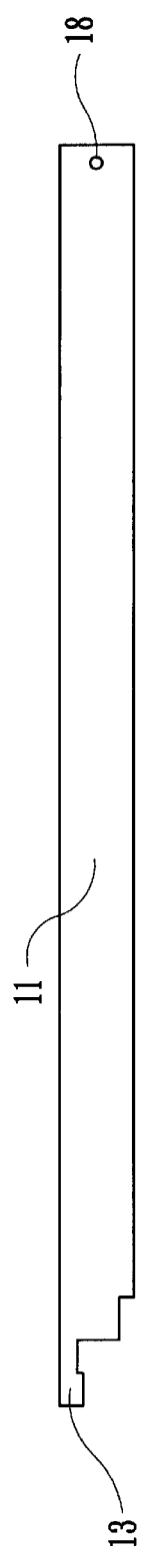
FIG. 14 shows the schematic view of an optical calibration plate according to the eleventh preferred embodiment of the present invention.

FIG. 14 shows the schematic view of an optical calibration plate 1 according to the eleventh preferred embodiment of the present invention. The optical calibration plate 1 comprises an optical calibration region 11, a positioning hole 18 on the right side of the optical calibration region 11, and a step-shaped locking part 13 on the left top side of the optical calibration region 11.

To sum up, the optical calibration plate according to the present invention has following advantages:

(1) Easy assembling.

(2) Low cost due to elimination of protective film and binder lid.

(3) Less contamination because the operator will not touch the optical calibration region.

(4) Less processing time.

(5) Enhanced yield.

Although the present invention has been described with reference to the referred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A method of assembling an optical calibration plate to a cover of an optical apparatus, comprising the steps of:
    (a) providing an optical calibration plate having at least one side formed with a step-shaped locking portion;
    (b) clamping a first side of said optical calibration plate to a cover of an optical apparatus; and,
    (c) engaging said step-shaped locking portion of a second side of said optical calibration plate to a complementary portion of said cover.

2. The method as recited in claim 1, wherein the step of providing an optical calibration plate includes the step of providing an optical calibration plate with at least one positioning hole formed in said first side of said optical calibration plate, said step of clamping including the step of engaging said at least one positioning hole to at least one clamping shaft of said cover of said optical apparatus.

* * * * *